US011755477B2

(12) United States Patent
Patel et al.

(10) Patent No.: US 11,755,477 B2
(45) Date of Patent: Sep. 12, 2023

(54) CACHE ALLOCATION POLICY

(71) Applicant: Advanced Micro Devices, Inc., Santa Clara, CA (US)

(72) Inventors: Chintan S. Patel, San Antonio, TX (US); Girish Balaiah Aswathaiya, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 16 days.

(21) Appl. No.: 17/563,675

(22) Filed: Dec. 28, 2021

(65) Prior Publication Data

US 2023/0105709 A1 Apr. 6, 2023

Related U.S. Application Data

(60) Provisional application No. 63/251,951, filed on Oct. 4, 2021.

(51) Int. Cl.
*G06F 12/00* (2006.01)
*G06F 12/0802* (2016.01)

(52) U.S. Cl.
CPC .... *G06F 12/0802* (2013.01); *G06F 2212/604* (2013.01)

(58) Field of Classification Search
CPC .......... G06F 12/0802; G06F 2212/604; G06F 9/3838
See application file for complete search history.

(56) References Cited

U.S. PATENT DOCUMENTS

2018/0196706 A1* 7/2018 Gerber ................ G06F 11/1004
2018/0349280 A1* 12/2018 Prasad ................ G06F 12/128

* cited by examiner

*Primary Examiner* — Shawn X Gu
(74) *Attorney, Agent, or Firm* — Polansky & Associates, P.L.L.C.; Paul J. Polansky (57) ABSTRACT

A cache includes an upstream port, a downstream port, a cache memory, and a control circuit. The control circuit temporarily stores memory access requests received from the upstream port, and checks for dependencies for a new memory access request with older memory access requests temporarily stored therein. If one of the older memory access requests creates a false dependency with the new memory access request, the control circuit drops an allocation of a cache line to the cache memory for the older memory access request while continuing to process the new memory access request.

20 Claims, 4 Drawing Sheets

CACHE ALLOCATION POLICY

This application claims priority to provisional application U.S. 63/251,951, filed Oct. 4, 2021, the entire contents of which are incorporated herein by reference.

BACKGROUND

A known way to increase the performance of a computer system is to include a local, high-speed memory known as a cache. A cache increases system performance because there is a high probability that once a data processor such as a central processing unit (CPU) core or a graphics processing unit (GPU) accesses a data element at a particular address, its next access will be to an adjacent address. The cache fetches and stores data which is located adjacent to the requested piece of data from a slower, main memory or lower-level cache so that it is then available for fast accessing by the data processor. In high-performance computer systems, several caches may be placed in a hierarchy. The cache which is closest to the CPU, known as the upper-level or "L1" cache, is the highest-level cache in the hierarchy and is generally the fastest. Other, generally slower caches are then placed in descending order in the hierarchy starting with the "L2" cache, etc., until the lowest level cache which is connected to main memory.

In a typical configuration, a data processor accesses its own dedicated L1 cache, while sharing a last level cache (LLC) with at least one other data processor. The LLC operates as the last cache between the processor cores and off-chip main memory. The off-chip main memory typically includes commercially available dynamic random-access memory (DRAM) chips such as double data rate (DDR) synchronous DRAMs (SDRAMs). The off-chip memory accesses are relatively slow, thus preventing accesses whose contents are not located in the cache hierarchy from resolving for a significant amount of time.

Because modern data processors are pipelined and process program threads in parallel, the cache hierarchy must check for dependencies between in-flight accesses. For example, if an older instruction indicates a write to a memory location but a subsequent instruction in program order attempts to read the data at the same memory address, the cache has to stall the issuance of the read access until the write access fully completes. This conflict, known as same-address ordering, is a true dependency. On the other hand, two transactions that try to access two different addresses that are in the same set of the cache is a false dependency, because both accesses could occur without causing program failure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A cache includes an upstream port, a downstream port, a cache memory, and a control circuit. The control circuit temporarily stores memory access requests received from the upstream port, and checks for dependencies for a new memory access request with older memory access requests temporarily stored therein. If one of the older memory access requests creates a false dependency with the new memory access request, the transaction queue/scheduler drops an allocation of a cache line to the cache memory for the older memory access request while continuing to process the new memory access request.

A data processing system includes at least one memory accessing agent for generating memory access requests, a cache coupled to the at least one memory accessing agent, and a lower-level memory system coupled to the cache. The cache uses a control circuit to temporarily store the memory access requests received from the at least one memory accessing agent, and checks for dependencies for a new memory access request with older memory access requests temporarily stored therein. If one of the older memory access requests creates a false dependency with the new memory access request, the cache drops an allocation of a cache line to the cache for the older memory access request while continuing to process the new memory access request.

A method for allocating lines in a cache of a data processing system includes receiving a new memory access request. Whether the new memory access request hits in the cache is determined. If the new memory access request misses in the cache, whether a dependency exists between the new memory access request and an older memory access request to a lower-level memory system temporarily stored in a control circuit of the cache is checked. If there is a false dependency between the new memory access request and an older memory access request to the lower-level memory system, an allocation of the older memory access request to the cache is dropped while the new memory access request continues to be processed.

While some computer systems reduce the probability of false dependencies by hashing address bits before mapping them to the physical lines of the cache, this strategy does not eliminate them and the problem of system inefficiency caused by false dependencies remains. Thus, according to various embodiments described herein, a cache continues to detect false dependencies, but mitigates their impact by providing a relief mechanism, known as "drop allocate".

In some embodiments, the drop allocate policy provides relief for a false dependency in WAR (write after read) and RAR (read after read) cases by dropping the allocation of the line into the cache that would normally be caused by the older operation, thereby allowing the younger operation to make progress toward completion earlier. Specifically, the largest time spent by an older read occurs when it experiences a miss in the cache, and the cache must fetch the data from the memory (or next-level cache). Without the drop allocate policy, the younger request would wait for the false dependency to resolve (when a response is seen) prior to allowing progress on the younger request. The "drop allocate" policy allows for an on-the-fly determination of such a false dependency, and triggers the older read to not allocate an entry in the cache, thereby allowing the false dependency to clear earlier. This mechanism helps with Quality of Service (QoS) guarantees as well as general performance because it reduces the maximum latency experienced by any client.

In some embodiments, the cache adds a filter on the types of requests that may force a "drop allocate" on an older read. The filtering can be done based on source of the request, the priority of the request, etc.

In some embodiments, the cache can mitigate the lower hit rate by including a filter having a hit predictor to determine whether to perform the drop allocate operation based on the predicted hit rate, thereby reducing the hit-rate impact of dropping the allocation of such accesses.

Embodiments of a cache that implements false dependency mitigation using the drop allocate mechanism will now be explained in the context of an exemplary data processor with a cache hierarchy.

Figure 1:
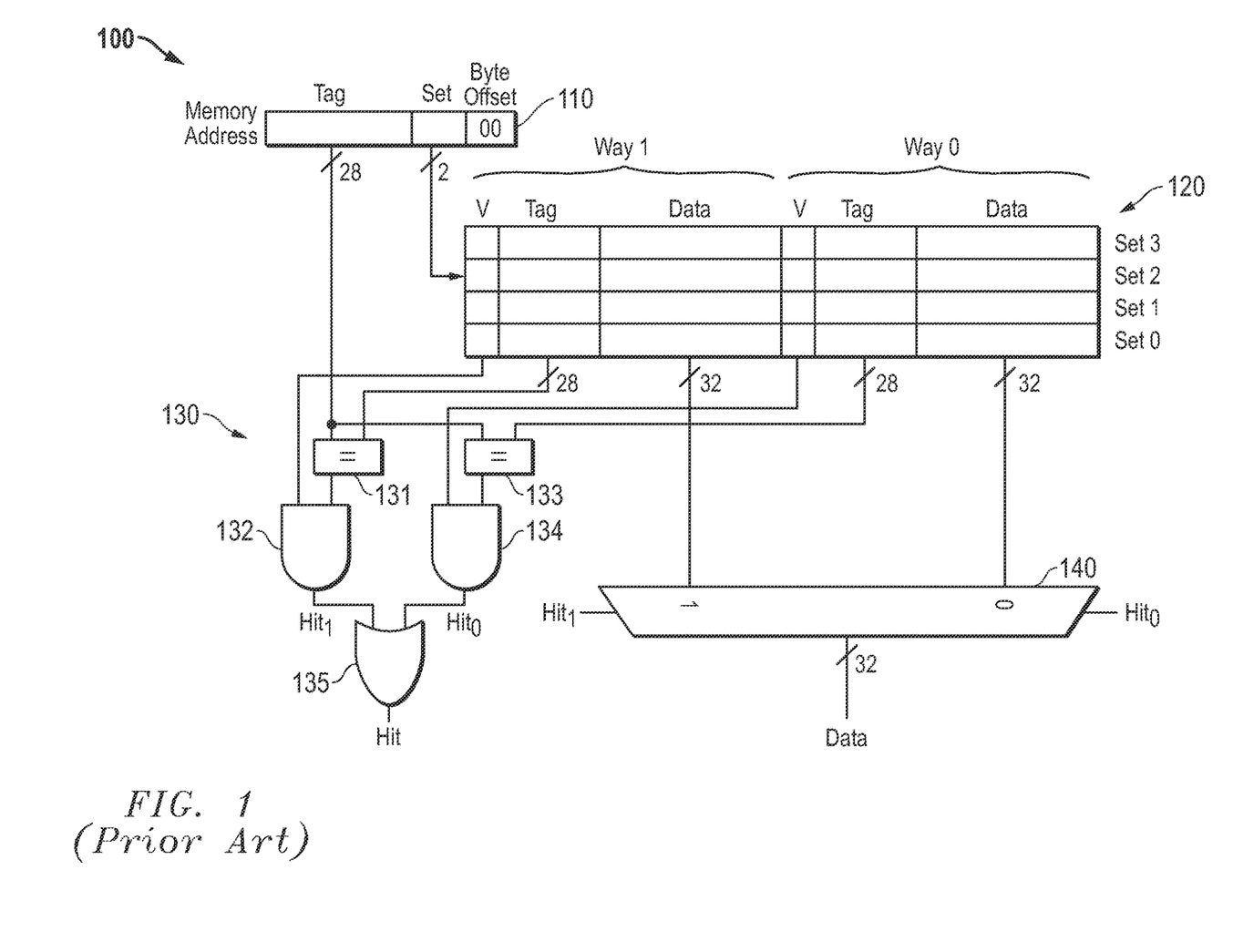
FIG. 1 illustrates in block diagram form a lookup system for an associative cache known in the prior art.

FIG. 1 illustrates in block diagram form a lookup system for a cache 100 known in the prior art. Cache 100 receives a memory address 110 of a memory access request, either a read access request or a write access request, and first uses memory address 110 to perform a lookup to see if a cache line having the accessed data element is stored in the cache. In the example shown in FIG. 1, memory address 110 is a 32-bit address having three fields: a 28-bit tag field labeled "Tag", a 2-bit set field labeled "Set", and a 2-bit byte offset field labeled "Byte Offset" that is used for cache lookups.

Cache 100 is a simple, 2-way set associative cache and includes a memory 120 for storing cache lines. Each "way" corresponds to a possible location of the cache line in memory 120. Memory 120 has two portions for storing the two ways labeled "Way 0" and "Way 1". Each of Way 0 and Way 1 has four lines that are associatively addressed by the Set bits of the memory address. For example, if the Set bits are 00, then the cache looks up Set 0 in both Way 0 and Way 1 as two possible locations of the cache line. Each cache line in memory 120 includes a data portion labeled "Data", a tag portion labeled "Tag", and a metadata portion storing information about the cache line. The metadata portion may include information about the usage of the cache line, whether the cache line has been modified, and the recency of use, and as shown in cache 100, the metadata includes at least a valid bit labeled "V".

Cache 100 also includes a comparison logic circuit 130 to determine whether memory address 110 is stored in cache 100 during a lookup operation. Comparison logic circuit 130 includes a digital comparator 131 labeled "=", an AND gate 132, a digital comparator 133 labeled "=", an AND gate 134, and an OR gate 135. Digital comparator 131 has a first input for receiving the Tag field of memory address 110, a second input for receiving the TAG field from the accessed set of Way 1, and an output. AND gate 132 has a first input for receiving the V bit from the accessed set of Way 1, a second input connected to the output of digital comparator 131, and an output for providing a signal labeled "Hit". Digital comparator 133 has a first input for receiving the Tag field of memory address 110, a second input for receiving the TAG field from the accessed set of Way 0, and an output. AND gate 134 has a first input for receiving the V bit from the accessed set of Way 0, a second input connected to the output of digital comparator 133, and an output for providing a signal labeled "$Hit_0$". OR gate 135 has a first input connected to the output of AND gate 132, a second input connected to the output of AND gate 134, and an output for providing a signal labeled "Hit". Comparison logic 130 determines whether there is a hit of a valid memory address in either Way 1 or Way 0, and if so which way contained the hit. If memory address 110 matches either Way 0 or Way 1, OR gate 135 provides the Hit signal in an active state at a logic high to indicate a cache hit. If memory address 110 does not match in either Way 0 or Way 1, OR gate provides the Hit signal in an inactive logic state at a logic low to indicate a cache miss.

Finally, cache 100 includes a multiplexer 140. Multiplexer 140 has a first input connected to the Data field of the accessed set of Way 0, a second input connected to the Data field of the accessed set of Way 1, a first control input for receiving the $Hit_0$ signal, a second control input for receiving the $Hit_1$ signal, and an output for providing an output Data signal. Multiplexer 140 outputs the Data from the accessed set of Way 0 in response to an activation of the $Hit_0$ signal, or the Data from the accessed set of Way 1 in response to an activation of the $Hit_1$ signal, but blocks both Data fields if neither $Hit_0$ nor $Hit_1$ is active.

In a larger cache with more sets, comparison logic circuit 130 becomes more complex and the cache takes more time to resolve whether an access is a hit or a miss. In addition, and especially if the cache is a last-level cache, a cache miss results in a need to access main memory, which typically involves a significant amount of latency. In addition, even with more sets, there is significant probability that two transactions will be pending at the same time that access two different addresses that are in the same set of the cache, i.e., they are false dependencies. If a memory accessing agent needs low latency for a transaction, the longer delay of the access until the false dependency clears may eventually cause program stalling, which may prevent certain memory accessing agents with isochronous workloads from operating properly.

Cache 100 is an example of the storage of memory elements in a cache and a lookup of the cache known in the prior art. Cache 100 can be an instruction cache, a data cache, or a combined instruction-and-data cache. Cache 100 supports 32 address bits of a memory address that are used to attempt to access the cache. The memory address has bits that identify a "Set" and a "tag". In this example, the cache supports two "Ways", i.e., two possible sets of entries with matching Set values, and is therefore known as a 2-way set associative cache. The Set includes two bits that point to different locations in each Way of the cache where the accesses memory location may be stored, and as shown in FIG. 1 includes "Set 0" through "Set 3". Upon receiving a memory access, a cache controller (not shown in FIG. 1) indexes into the corresponding Set of each Way of the cache to determine if the corresponding Set stores a Tag that matches other bits of the address. If a stored Tag matches the tag field of the memory address, then the access "hits" in the cache. On the other hand, if a stored Tag does not match the tag field of the memory address for either Way 1 or Way 0, then the access "misses" in the cache and must be presented to the next lower-level cache or to the memory system.

The difference between a true dependency and a false dependency will now be explained in terms of concrete examples. An example of a true dependency would be an older memory access with a memory address that will be allocated to the cache, followed by a younger memory access that has the same Set and Tag fields. In this case, the younger access must wait until the cache line is fetched from main memory and stored in the cache before it can proceed. Because the DRAM memory controller typically tries to group operations for high efficiency, the cache line may not be allocated to the cache so that the requested data is not available for many clock cycles. This slow response time can impact many processors, such as those with isochronous workloads.

An example of a false dependency would be an older memory access with a memory address that will be allocated to the cache, followed by a memory access that has the same SET and field but different TAG fields. In this case, known caches will stall the issuance of the younger access until the older access is completed, which increases latency.

Figure 2:
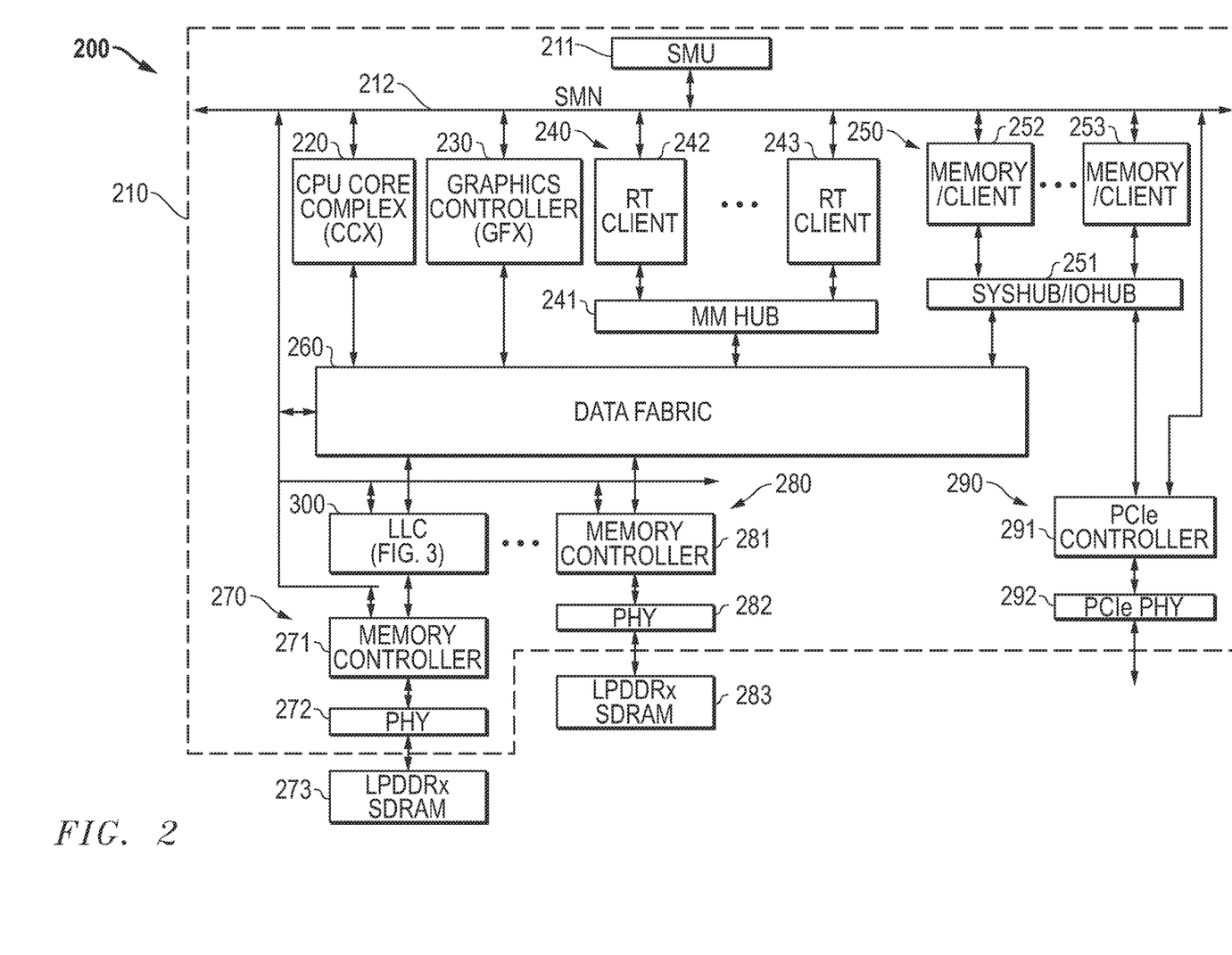
FIG. 2 illustrates in block diagram form a data processing system having a cache according to some embodiments.

FIG. 2 illustrates in block diagram form a data processing system 200 having a cache 300 according to some embodiments. Data processing system 200 includes a data processor in the form of an SOC 210 and external memory in the form of low-power double data rate synchronous dynamic random-access memories (LPDDRx SDRAMs) 273 and 283. Many other components of an actual data processing system are typically present but are not relevant to understanding the present disclosure and are not shown in FIG. 2 for ease of illustration.

SOC 210 includes generally a system management unit (SMU) 211, a system management network (SMN) 212, a central processing unit (CPU) core complex 220 labeled "CCX", a graphics controller 230 labeled "GFX", a real-time client subsystem 240, a memory/client subsystem 250, a data fabric 260, memory channels 270 and 280, a Peripheral Component Interface Express (PCIe) subsystem 290, and a cache 300 labeled "LLC". As will be appreciated by a person of ordinary skill, SOC 210 may not have all of these elements present in every embodiment and, further, may have additional elements included therein.

SMU 211 is bidirectionally connected to the major components in SOC 210 over SMN 212. SMN 212 forms a control fabric for SOC 210. SMU 211 is a local controller that controls the operation of the resources on SOC 210 and synchronizes communication among them. SMU 211 manages power-up sequencing of the various processors on SOC 210 and controls multiple off-chip devices via reset, enable and other signals. SMU 211 includes one or more clock sources (not shown), such as a phase locked loop (PLL), to provide clock signals for each of the components of SOC 210. SMU 211 also manages power for the various processors and other functional blocks, and may receive measured power consumption values from CPU cores in CPU core complex 220 and graphics controller 230 to determine appropriate P-states.

CPU core complex 220 includes a set of CPU cores, each of which is bidirectionally connected to SMU 211 over SMN 212. Each CPU core may be a unitary core only sharing a last-level cache with the other CPU cores, or may be combined with some but not all of the other cores in clusters.

Graphics controller 230 is bidirectionally connected to SMU 211 over SMN 212. Graphics controller 230 is a high-performance graphics processing unit capable of performing graphics operations such as vertex processing, fragment processing, shading, texture blending, and the like in a highly integrated and parallel fashion. In order to perform its operations, graphics controller 230 requires periodic access to external memory. In the embodiment shown in FIG. 2, graphics controller 230 shares a common memory subsystem with CPU cores in CPU core complex 220, an architecture known as a unified memory architecture. Because SOC 210 includes both a CPU and a GPU, it is also referred to as an accelerated processing unit (APU).

Real-time client subsystem 240 includes a set of real-time clients such as representative real time clients 242 and 243, and a memory management hub 241 labeled "MM HUB". Each real-time client is bidirectionally connected to SMU 211 over SMN 212, and to memory management hub 241. Real-time clients could be any type of peripheral controller that require periodic movement of data, such as an image signal processor (ISP), an audio coder-decoder (codec), a display controller that renders and rasterizes objects generated by graphics controller 230 for display on a monitor, and the like.

Memory/client subsystem 250 includes a set of memory elements or peripheral controllers such as representative memory/client devices 252 and 253, and a system and input/output hub 251 labeled "SYSHUB/IOHUB". Each memory/client device is bidirectionally connected to SMU 211 over SMN 212, and to system and input/output hub 251. Memory/client devices are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like.

Data fabric 260 is an interconnect that controls the flow of traffic in SOC 210. Data fabric 260 is bidirectionally connected to SMU 211 over SMN 212, and is bidirectionally connected to CPU core complex 220, graphics controller 230, memory management hub 241, system and input/output hub 251. Data fabric 260 includes a crossbar switch for routing memory-mapped access requests and responses between any of the various devices of SOC 210. It includes a system memory map, defined by a basic input/output system (BIOS), for determining destinations of memory accesses based on the system configuration, as well as buffers for each virtual connection.

Memory channels 270 and 280 are examples of lower-level memory systems and are circuits that control the transfer of data to and from external memories 273 and 283 that form a main memory. Memory channel 270 is formed by a memory controller 271 and a physical interface circuit 272 labeled "PHY" connected to external memory 273. Memory controller 271 is bidirectionally connected to SMU 211 over SMN 212 and has an upstream port bidirectionally connected to data fabric 260 through cache 300, and a downstream port. Physical interface circuit 272 has an upstream port bidirectionally connected to memory controller 271, and a downstream port bidirectionally connected to external memory 273. Similarly, memory channel 280 is formed by a memory controller 281 and a physical interface circuit 282 connected to external memory 283. Memory controller 281 is bidirectionally connected to SMU 211 over SMN 212 and has an upstream port bidirectionally connected to data fabric 260, and a downstream port. Physical interface circuit 282 has an upstream port bidirectionally connected to memory controller 281, and a downstream port bidirectionally connected to external memory 283.

Peripheral Component Interface Express (PCIe) subsystem 290 includes a PCIe controller 291 and a PCIe physical interface circuit 292. PCIe controller 291 is bidirectionally connected to SMU 211 over SMN 212 and has an upstream port bidirectionally connected to system and input/output hub 251, and a downstream port. PCIe physical interface circuit 292 has an upstream port bidirectionally connected to PCIe controller 291, and a downstream port bidirectionally connected to a PCIe fabric, not shown in FIG. 2. PCIe controller is capable of forming a PCIe root complex of a PCIe system for connection to a PCIe network including PCIe switches, routers, and devices.

Cache 300 is connected between data fabric 260 and memory controller 271. LLC 300 has an upstream port bidirectionally connected to data fabric 260, and a downstream port bidirectionally connected to memory controller 271. Cache 300 implements the drop allocation policy described above, and the structure of cache 300 will be explained further below.

In operation, SOC 210 integrates a complex assortment of computing and storage devices, including CPU core complex 220 and graphics controller 230, on a single chip. Most of these controllers are well-known and will not be discussed further. CPU core complex 220 and graphics controller 230 include internal caches that in conjunction with cache 300 form a deep cache hierarchy. Various memory accessing agents such as graphics controller 230 and the real time clients in real-time client subsystem 240 may have isochronous workloads that require certain functions to be completed within specified amounts of time. For example, a graphics controller may need to render a frame to meet real-time display requirements, and one of the real-time clients in real-time client subsystem 240 may be a display controller that requires a frame buffer to be accessed within a certain amount of time to prevent stalling or stuttering of the display and therefore to preserve user experience. Occasionally in known systems based on other activities in the system, the cache hierarchy may stall their accesses to needed data because of the detection of false dependencies. As will be described below, however, cache 300 implements the drop allocate policy that mitigates stalling due to false dependencies, allowing real-time and isochronous accesses to be processed through the cache hierarchy with lower latency.

Figure 3:
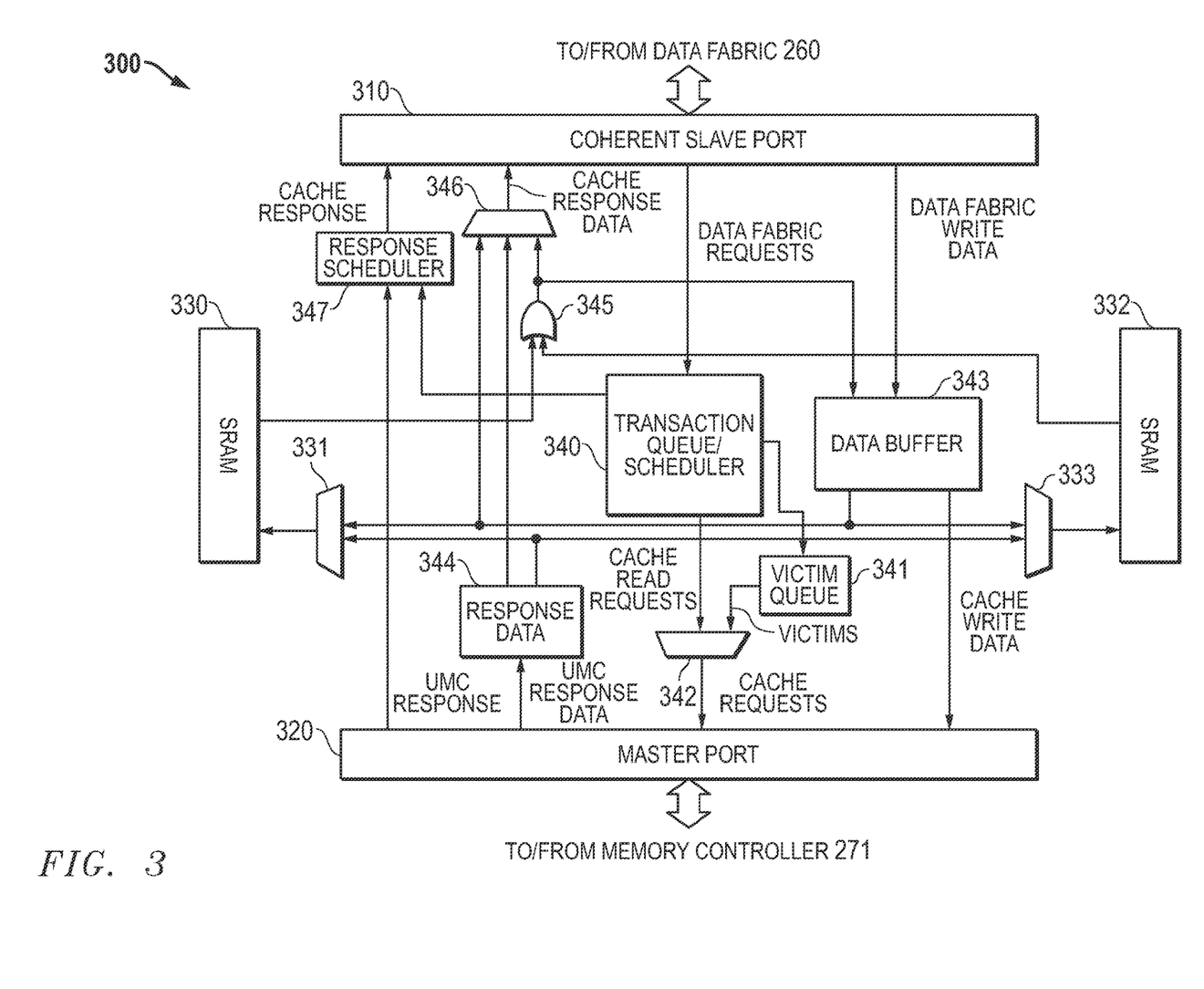
FIG. 3 illustrates in block diagram form an implementation of the cache of FIG. 2 according to some embodiments.

FIG. 3 illustrates in block diagram form an implementation of cache 300 of FIG. 2 according to some embodiments. Cache 300 includes generally a coherent slave port 310, a master port 320, static random-access memories (SRAMs) 330 and 332, a control circuit 340 labeled "TRANSACTION QUEUE/SCHEDULER", a victim queue 341, a multiplexer 342, a data buffer 343, a response data buffer 344, an OR gate 345, a multiplexer 346, and a response scheduler 347.

Coherent slave port 310 is an upstream port that is bidirectionally connected to data fabric 260, a first input for receiving an signal labeled "CACHE RESPONSE", a second input for receiving a signal labeled "CACHE RESPONSE DATA", a first output for providing a signal labeled "DATA FABRIC REQUESTS", and a second output for providing a signal labeled "DATA FABRIC WRITE DATA". Master port 320 is a downstream port having a first input for receiving a signal labeled "CACHE REQUESTS", a second input for receiving a signal labeled "CACHE WRITE DATA", a first output for providing a signal labeled "UMC RESPONSE", a second output for providing a signal labeled "UMC RESPONSE DATA", and an downstream port connected to memory controller 271. SRAM 330 has an input for receiving addresses and data, and an output for providing data. Multiplexer 331 is associated with SRAM 330 and has a first input, a second input, and an output connected to the input of SRAM 330. Similarly, SRAM 332 has an input for receiving addresses and data, and an output for providing data. Multiplexer 333 is associated with SRAM 332 and has a first input, a second input, and an output connected to the input of SRAM 332.

Control circuit 340 is connected to the first output of coherent slave port 310 for receiving the DATA FABRIC REQUESTS, and has a first output for providing a signal labeled "CACHE READ REQUESTS", a second output for providing victim cache lines, and a third output for providing responses. Victim queue 341 has an input connected to the second output of control circuit 340, and an output for providing a value labeled "VICTIMS". Multiplexer 342 has a first input connected to the first output of control circuit 340 for receiving the CACHE READ REQUESTS, a second input connected to the output of victim queue 341 for receiving the VICTIMS, and an output connected to the first input of master port 320 for providing the CACHE REQUESTS. Data buffer 343 has a first input, a second input connected to the second output of coherent slave port 310 for receiving the DATA FABRIC WRITE DATA, a first output connected to the first inputs of multiplexers 331 and 333, and a second output connected to the second input of master port 320 for providing the CACHE WRITE DATA.

Response data buffer 344 has an input connected to the second output of master port 320 for receiving the UMC RESPONSE DATA, a first output, and a second output connected to the second inputs of multiplexers 331 and 333. OR gate 345 has a first input connected to the output of SRAM 330, a second input connected to the output of SRAM 332, and an output connected to the first input of data buffer 343. Multiplexer 346 has a first input connected to the first output of data buffer 343, a second input connected to the first output of response data buffer 344, and an output connected to the second input of coherent slave port 310 for providing the CACHE RESPONSE DATA. Response scheduler 347 has a first input connected to the first output of master port 320 for receiving the UMC RESPONSE, a second input connected to the third output of control circuit 340, and an output for providing the CACHE RESPONSE to the first input of coherent slave port 310.

Cache 300 is a last-level cache (LLC) and coherency point in data processing system 200, but according to the principles herein, could be another cache in the cache hierarchy. It is organized as a set-associative, inclusive LLC and thus has a large data store implemented using SRAMs 330 and 332 as the cache memory that are separated into two parts to ease routing delays. For example, in one embodiment, cache 300 can be a 4 MB (4 megabyte), 16-way set associative cache in a system having 4 GB (4 gigabytes) of main memory. Thus, at any time cache 300 would store no more than 1/1000 of the contents of main memory.

In this example, because of the relatively large number of sets, each access requires sixteen comparisons. Control circuit 340 receives cache line fill requests and temporarily stores a copy of the data before forwarding it to an upper-level cache associated with a requesting node. In some embodiments, control circuit 340 includes a transaction queue for temporarily storing such requests. In some embodiments, control circuit 340 operates as a scheduler to schedule memory access requests to SRAMs 330 and 332. Cache 300 includes data buffer 343 for pending writes to main memory, victim queue 341 for pending victim writebacks to main memory, and response data buffer 344 for storing data returned from main memory. It should be apparent that cache 300 is just an example of a cache that supports the drop allocation feature, and many other cache topologies are possible.

Figure 4:
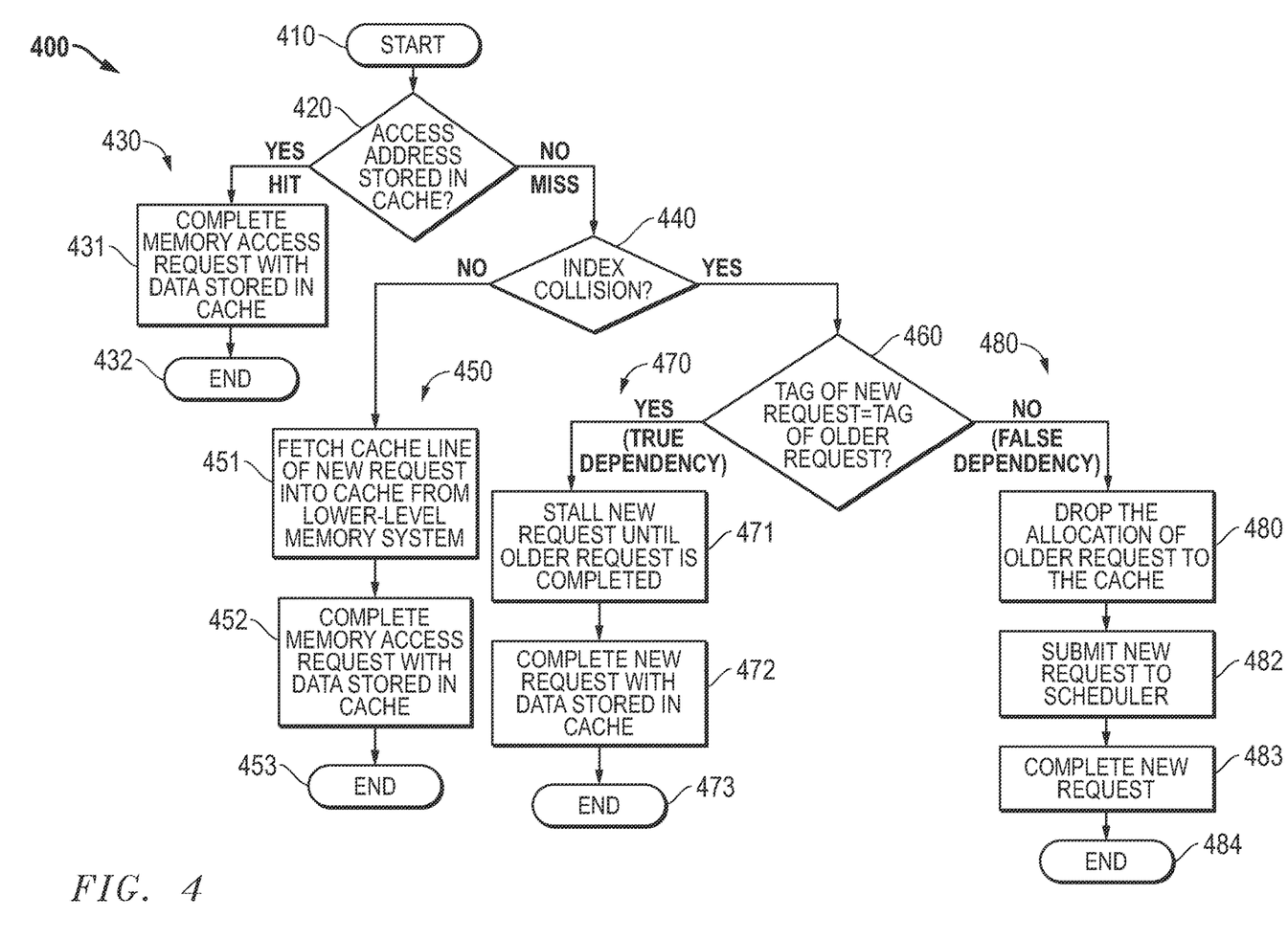
FIG. 4 illustrates a flow chart showing the operation of the transaction queue/scheduler of FIG. 3 during a cache lookup operation according to some embodiments.

FIG. 4 illustrates a flow chart 400 showing the operation of control circuit 340 of FIG. 3 during a cache lookup operation according to some embodiments. Flow chart 400 starts at box 410. A decision box 420 determines whether the access address is stored in the cache, i.e., whether there is a cache hit or a cache miss. If there is a cache hit, flow proceeds to a sub-flow 430. In sub-flow 430, an action box 431 completes the memory access request with the data stored in the cache. If the access is a read access request, the portion of the cache line indicated by the address in the read access request is returned to the memory accessing device, and the LRU bits are updated. If the access is a write access request, the portion of the cache line indicated by the address in the write access request is overwritten with the new data and returned to the memory accessing device, the line state is changed to modified if not already in this state, the LRU bits are updated, and a completion response is returned to the memory access requestor. Sub-flow 430 ends at box 432.

If there is a cache miss, flow proceeds to a decision box 440. Decision box 440 determines whether there is an index collision by checking the Set bits of the access address with the Set of other pending cache accesses in each Way. If there is no index collision, then flow proceeds to a sub-flow 450. In sub-flow 450, in an action box 451 cache 300 fetches the cache line of the new memory access request from the lower-level memory system. In the example of FIG. 2, the lower-level memory system is main memory and cache 300 will complete the cache line fill by sending a read request to memory controller 271 for dispatch to memory 273. Prior to completing the cache line fill, cache 300 will pick a place for storing the cache line either in a Way that is marked invalid, or if all Ways are valid, the Way having the least-recently used cache line. Once the cache line fill is completed, the memory access request can be completed with the new cache line. If the access is a read access, the accessed data word is read and returned to the memory accessing device. If the access is a write access, the portion of the cache line indicated by the address in the write access is overwritten with the new data, the line state is changed to modified, the LRU bits are updated, and a completion response is returned to the memory access requestor. Sub-flow 450 ends at box 453.

If there is an index collision, then flow proceeds to decision box 460, which determines whether the tag of the newer request is equal to the tag of the older request, i.e., whether or not there is a true dependency. If so, then flow proceeds to a sub-flow 470. In sub-flow 470, in an action box 471, cache 300 stalls the new request until the older request is completed. In an action box 472, once the older request has been completed, the newer request is completed with the data that is now stored in the cache. If the memory access is a write access, the portion of the cache line indicated by the address in the write access request is overwritten with the new data and returned to the memory accessing device, the line state is changed to modified, the LRU bits are updated, and a completion response is returned to the memory access requestor. Sub-flow 470 ends at box 473.

If the tag of the newer request is not equal to the tag of any older request, there is only a false dependency, and flow proceeds to a sub-flow 480. In sub-flow 480, in an action box 481, cache 300 drops the allocation of the older cache line to cache 300. Dropping the allocation of the older cache line only prevents the cache from storing it, but as a result of the memory access request, the system will store the correct data in main memory. However, in a subsequent action box 482, the new memory access request is submitted to control circuit 340. In an action box 483, the new request can be operated on immediately, without waiting for the allocation of the older cache line to the cache. If the new memory access request is a read access request, the read access request is sent to memory controller 271. If the new memory access request is a write access, then the write access is committed to the memory system, and existing mechanisms in memory controller 271 will ensure that it gets processed before any later-received writes. In either case, the new memory access request can make progress through cache 300 without waiting on the older memory access request to be completed. Thus, the additional stalling due to the index collision that only resulted in a false dependency will be avoided, lowering wort-case access latency for memory accessing agents, especially those with real-time or isochronous workloads, without waiting for the allocation of the older request to the cache. Sub-flow 480 ends at box 484.

An integrated circuit that has a cache implementing the drop allocate policy, or any portions thereof, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while the exemplary cache was a last-level cache, this technique could be used by a cache at any level of the cache hierarchy. Moreover, the exemplary data processing system was an accelerated processing unit (APU) with various data processing and real-time clients, but in other embodiments, a cache implementing the drop allocate policy can be used with a different combination of processing elements. Also, the specific circuits and buffers described herein for cache 300 will vary in other embodiments. While the large cache data storage in the exemplary cache memory was split into two sections, in other embodiments the cache memory could use a single cache memory section or more than two cache memory sections.

Accordingly, it is intended by the appended claims to cover all modifications of the disclosed embodiments that fall within the scope of the disclosed embodiments.

What is claimed is:

1. A cache, comprising:
   an upstream port;
   a downstream port;
   a cache memory; and
   a control circuit that:
   temporarily stores memory access requests received from said upstream port;
   checks for dependencies for a new memory access request with older memory access requests temporarily stored therein;
   and if one of said older memory access requests creates a false dependency with said new memory access request, drops an allocation of a cache line to said cache memory for said one of said older memory access requests while continuing to process said new memory access request.

2. The cache of claim 1, wherein:
   said control circuit uses said cache memory to operate as a set associative cache; and said one of said older memory access requests creates said false dependency with said new memory access request if said one of said older memory access requests accesses a different cache line address in a common set as said new memory access request.

3. The cache of claim 2, wherein:
said false dependency is a write-after-read (WAR) dependency.

4. The cache of claim 2, wherein:
said false dependency is a read-after-read (RAR) dependency.

5. The cache of claim 2, wherein:
said control circuit predicts a hit rate of said one of said older memory access requests, and in response to said hit rate exceeding a threshold, said control circuit allocates a cache line to said cache for said one of said older memory access requests, and stalls processing of said new memory access request.

6. The cache of claim 1, wherein:
the cache is a last-level cache; and
said downstream port is adapted to be coupled to a memory controller for a main memory.

7. The cache of claim 1, wherein:
said control circuit is further programmable to selectively drop said allocation in response to said false dependency.

8. The cache of claim 1, wherein:
said control circuit further selectively drops said allocation in response to said false dependency based on a quality of service (QoS) indicator of said new memory access request.

9. A data processing system, comprising:
at least one memory accessing agent for generating memory access requests;
a cache coupled to said at least one memory accessing agent; and
a lower-level memory system coupled to said cache, wherein said cache:
uses a control circuit to temporarily store said memory access requests received from said at least one memory accessing agent;
checks for dependencies for a new memory access request with older memory access requests temporarily stored therein; and
if one of said older memory access requests creates a false dependency with said new memory access request, drops an allocation of a cache line to said cache for said one of said older memory access requests while continuing to process said new memory access request.

10. The data processing system of claim 9, wherein:
said control circuit uses said cache to operate as a set associative cache; and
said one of said older memory access requests creates said false dependency with said new memory access request if said one of said older memory access requests accesses a different cache line address in a common set as said new memory access request.

11. The data processing system of claim 10, wherein:
said false dependency is a write-after-read (WAR) dependency.

12. The data processing system of claim 10, wherein:
said false dependency is a read-after-read (RAR) dependency.

13. The data processing system of claim 9, wherein:
said cache is a last-level cache; and
said lower-level memory system comprises a main memory and a memory controller for accessing said main memory.

14. The data processing system of claim 9, wherein:
said cache is programmable to selectively drop said allocation in response to said false dependency.

15. The data processing system of claim 9, wherein:
said cache further selectively drops said allocation in response to said false dependency based on a quality of service (QoS) indicator of said new memory access request.

16. A method for allocating lines in a cache of a data processing system, comprising:
receiving a new memory access request;
determining whether said new memory access request hits in said cache;
if said new memory access request misses in said cache, checking for a dependency between said new memory access request and an older memory access request to a lower-level memory system temporarily stored in a control circuit of said cache; and
if there is a false dependency between said new memory access request and a said older memory access request to said lower-level memory system, dropping an allocation of said older memory access request to said cache while continuing to process said new memory access request.

17. The method of claim 16, further wherein:
if said new memory access request hits in said cache, completing said new memory access request by accessing data in a corresponding cache line in a memory of said cache;
if there is no dependency between said new memory access request and any older memory access request to said lower-level memory system, completing said new memory access request by accessing said lower-level memory system; and
if there is a true dependency between said new memory access request and said older memory access request to said lower-level memory system, stalling an execution of said new memory access request until said older memory access request is completed.

18. The method of claim 16, wherein dropping said allocation of a corresponding cache line of said older memory access request to said cache while continuing to process said new memory access request comprises:
selectively dropping said allocation in response to a predicted hit rate of said new memory access request being less than a threshold.

19. The method of claim 16, wherein dropping said allocation of a corresponding cache line of said older memory access request to said cache while continuing to process said new memory access request comprises:
dropping said allocation of said older memory access request to said cache while continuing to process said new memory access request selectively in response to a programmable option.

20. The method of claim 16, wherein dropping said allocation of a corresponding cache line of said older memory access request to said cache while continuing to process said new memory access request comprises:
selectively dropping said allocation in response to said false dependency based on a quality of service (QoS) indicator of said new memory access request.

* * * * *